(12) United States Patent
Palacharla et al.

(10) Patent No.: US 7,327,954 B2
(45) Date of Patent: Feb. 5, 2008

(54) OPTICAL SIGNALING TO SHARE ACTIVE CHANNEL INFORMATION

(75) Inventors: Paparao Palacharla, Richardson, TX (US); Hok Yong Pua, Plano, TX (US); Emir Catovic, Plano, TX (US); Harbhajan Vridee, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 1130 days.

(21) Appl. No.: 10/161,274

(22) Filed: May 31, 2002

(65) Prior Publication Data

US 2004/0208520 A1    Oct. 21, 2004

(51) Int. Cl.
*H04B 10/08* (2006.01)
(52) U.S. Cl. .................... 398/30; 398/38; 398/31; 398/33; 398/58; 398/59; 398/60; 398/79; 398/140; 398/141; 398/158; 398/159; 398/165; 398/177; 398/181; 398/25
(58) Field of Classification Search .............. 398/38, 398/30, 31, 33, 58, 59, 60, 79, 141, 140, 398/158, 151, 159, 165, 177, 181, 25
See application file for complete search history.

(56) References Cited

U.S. PATENT DOCUMENTS

| 5,914,794 | A | 6/1999 | Fee et al. ............... 359/110 |
| 6,097,696 | A | 8/2000 | Doverspike ............ 370/216 |
| 6,304,347 | B1 * | 10/2001 | Beine et al. ............ 398/38 |
| 2001/0017723 | A1 | 8/2001 | Chang et al. ........... 359/128 |
| 2002/0027703 | A1 | 3/2002 | Kinoshita et al. ........ 359/337 |
| 2004/0071392 | A1 * | 4/2004 | Lauder .................... 385/17 |

\* cited by examiner

*Primary Examiner*—Hanh Phan
(74) *Attorney, Agent, or Firm*—Baker Botts L.L.P.

(57) ABSTRACT

A method for optical supervisory signaling includes determining a wavelength channel status (WCS) value, a wavelength channel failure (WCF) value, and a wavelength channel lit (WCL) value for each one of multiple data channels services by an optical communication node. The method further includes communicating the values to a second optical communication node.

4 Claims, 3 Drawing Sheets

OPTICAL SIGNALING TO SHARE ACTIVE CHANNEL INFORMATION

TECHNICAL FIELD OF THE INVENTION

This invention relates in general to optical communication networks, and more particularly to optical signaling to share active channel information.

BACKGROUND OF THE INVENTION

Wavelength division multiplexing (WDM) has greatly increased the flexibility and capability of optical networks. WDM allows many optical channels to be carried on a single fiber. However, there are few standards for error control and protection switching in WDM networks. As a result, optical networks may be subject to numerous forms of failure without adequate fault detection and remedial measures.

SUMMARY OF THE INVENTION

In accordance with the present invention, techniques for signaling to share channel information are provided. In particular, certain embodiments of the present invention include information that indicates whether particular channels in an optical signal are active. Such information allows optical networks to enable operations such as amplifier control and error response.

In a first embodiment, a method for optical supervisory signaling includes determining a wavelength channel status (WCS) value, a wavelength channel failure (WCF) value, and a wavelength channel lit (WCL) value for each one of multiple data channels serviced by an optical communication node. The method further includes communicating the values to a second optical communication node.

In a second embodiment, a method of controlling amplifiers in an optical communication network includes receiving an optical signal that includes multiple data channels and optical supervisory information. The method further includes determining the number of active data channels and adjusting an amplification level of an amplifier based on the number of active channels.

In a third embodiment, an optical communication node includes an amplifier and an optical supervisory module. The optical supervisory module receives an optical supervisory signal and determines a number of active channels based on the signal. The optical supervisory module then adjusts the amplification level of the amplifier based on the number of active channels.

Technical advantages of certain embodiments of the present invention include improved error response based on the knowledge of whether a channel is lit. For example, if a network element is aware through shared information that a channel that should have been attenuated is still lit, that network element can trigger an attenuator to remove the extraneous information. Conversely, if a channel that is supposed to be lit is not lit, the shared information may prove helpful to determine the location of the fault that caused the information to be absent.

Another technical advantage of certain embodiments of the present invention is the ability to dynamically control amplifier gain based on the number of channels actually in the signal. For example, an optical network element may know the number of provisioned channels to expect, yet not know the actual number of channels active. With shared information indicating the actual number of active channels, the network element can adjust an amplifier accordingly. For example, the optical network element may determine the number of channels lit in a received signal based on the shared information and adjust its amplifier gain based on the number of channels actually in the signal. This prevents the amplifier from over-amplifying a signal when channels that are expected to be present are actually absent or under amplified.

Particular embodiments of the present invention may include some, all, or none of the enumerated technical advantages. Additional technical advantages will be apparent to one skilled in the art from the following figures, description and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
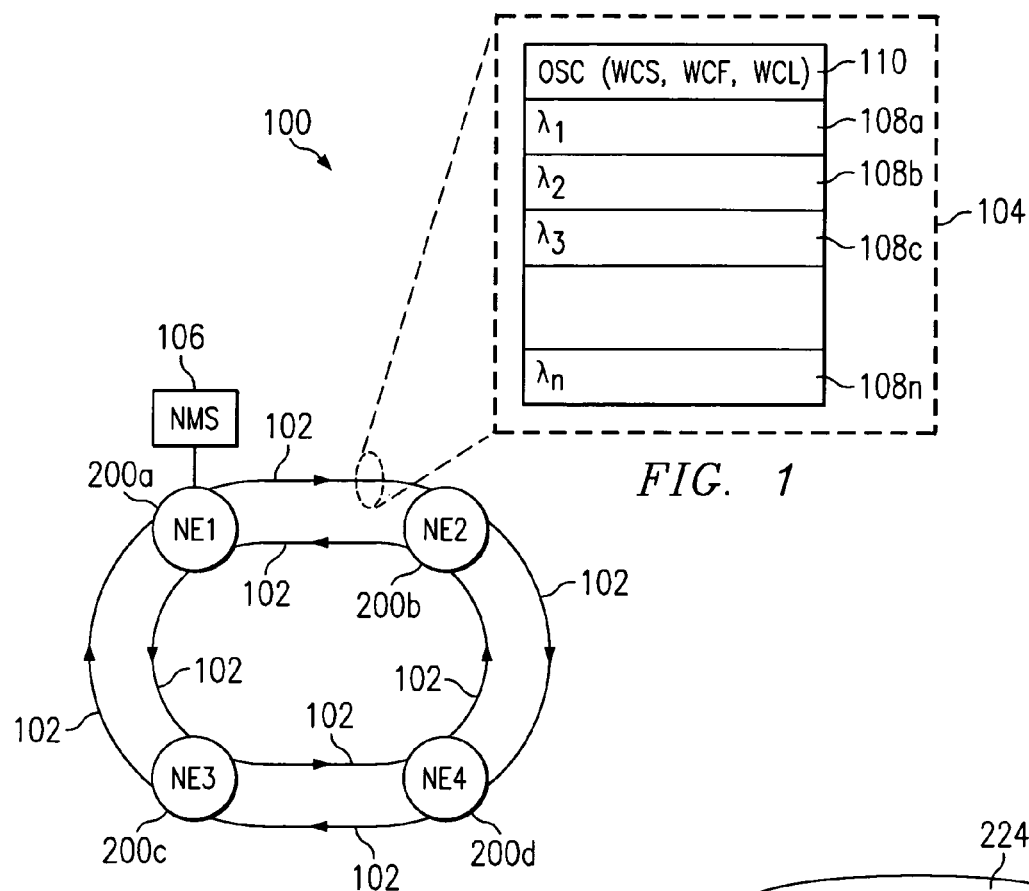
FIG. 1 shows an optical communication network with network elements that share channel information in accordance with particular embodiments of the present invention.

FIG. 1 shows an optical network 100 that communicates information between network elements 200 using optical connections 102. Optical network 100 generally represents any collection of hardware and/or software that communicates information between network elements 200 using optical links. In a particular embodiment, optical network 100 uses wavelength division multiplexing (WDM) or dense wavelength division multiplexing (DWDM) to communicate information on multiple channels, each channel using a different wavelength. Networks elements 200, referring generally to elements 200a, 200b, 200c, and 200d, represent any hardware and/or software that receives information carried around optical network 100 and processes that information in any suitable fashion. Elements 200 may include optical switches, amplifiers, add-drop multiplexers, optical-electronic converters, or any suitable hardware and/or software for handling optical signals.

Connections 102 between network elements 200 represent any suitable links for communicating optical signals 104 between network elements 200. As such, connections 102 may include any manner of optical fiber, amplifier, optical-electronic-optical (OEO) converters, repeaters, or any other suitable intermediate component. Connections 102 may carry information using any suitable format or protocol, and may also perform any necessary protocol conversion necessary to communicate information between elements 200. In a common optical network 100 configuration, connections 102 are unidirectional rather than bi-directional. In such cases, there will be an "eastbound" fiber or connection and a "westbound" fiber or connection, one of which goes clockwise around network 100 and the other counterclockwise. Each connection 102 may include several optical fibers for carrying information.

In a particular embodiment, connections 102 carry optical signals 104 that have a wavelength spectrum of the form shown in FIG. 1. In signal 104, the optical information is apportioned in several different wavelengths 108. Each wavelength 108 represents a particular channel, and information carried on connection 102 may be assigned to any particular wavelength 108 in optical signal 104. Using appropriate equipment, wavelengths 108 may be added, dropped, switched, or otherwise processed separately. A particular channel is said to be "lit" or "active" when light of the appropriate wavelength 108 appears on the channel, but it should be understood that the light need not be sustained in order for the channel to be "lit." Instead, "lit" refers to light of a particular wavelength 108 appearing in signal 104 within a particular period, whether the light itself is sustained, intermittent, or even sporadic.

Signal 104 also includes an optical supervisory channel (OSC) 110 that represents a wavelength assigned to carry information used for management of network 100. OSC 110 includes status information about each of the channels 108 communicated in optical signal 104. In a particular embodiment, OSC 110 includes three values of status information for each channel. The first value is a wavelength channel status value (WCS) that specifies whether a particular channel has been provisioned to carry information. The second value is a wavelength channel failure value (WCF) that indicates whether a failure has been detected with regard to the information on the particular channel identified by the value. The third value is a wavelength channel lit value (WCL) that indicates whether there is light present on the channel regardless of whether the channel has been provisioned or whether there has been a failure on the channel. The following description will focus on an out-of-band OSC 110 that includes WCS, WCF, and WCL, but it should be understood that the information may be carried in-band and that additional or different information may be shared between nodes as well.

OSC 110 may be used to communicate control information as well as the described status information. For example, in certain optical networks there may be a network management station (NMS) coupled to a particular network element 200. A user of NMS 106 may control, provision, or otherwise manage network elements 200 by communicating control information over OSC 110. This provides the user of NMS 106 control over elements of network 100, potentially through a single point of access.

In operation, network elements 200 share channel information allowing elements 200 to perform tasks including amplifier control and error response. For example, a WCL value allows a receiving network element 200 to determine the number of active channels in a signal by counting the number of channels with a "lit" WCL value. Thus, when there are fewer active channels than expected, element 200 may reduce its amplification level for the incoming signal 104, so that the information on the channels is not distorted by over-amplification. Similarly, if there are more active channels than expected, element 200 may boost the amplification level for the incoming signal to ensure that all channels are sufficiently amplified. In another example, element 200 may update a WCL value to reflect the presence of light on an unprovisioned channel or the absence of light on a provisioned channel. This information allows technicians and other users of the system to identify a failure point by detecting the change in WCL values. Furthermore, the technician may use the information to assist in determining the type of failure. Different types of error that may manifest themselves by the presence of absence of light include component failure, fiber cuts, light leakage, and faulty provisioning, and sharing the WCL value permits a technician to distinguish many different types of errors.

Figure 2:
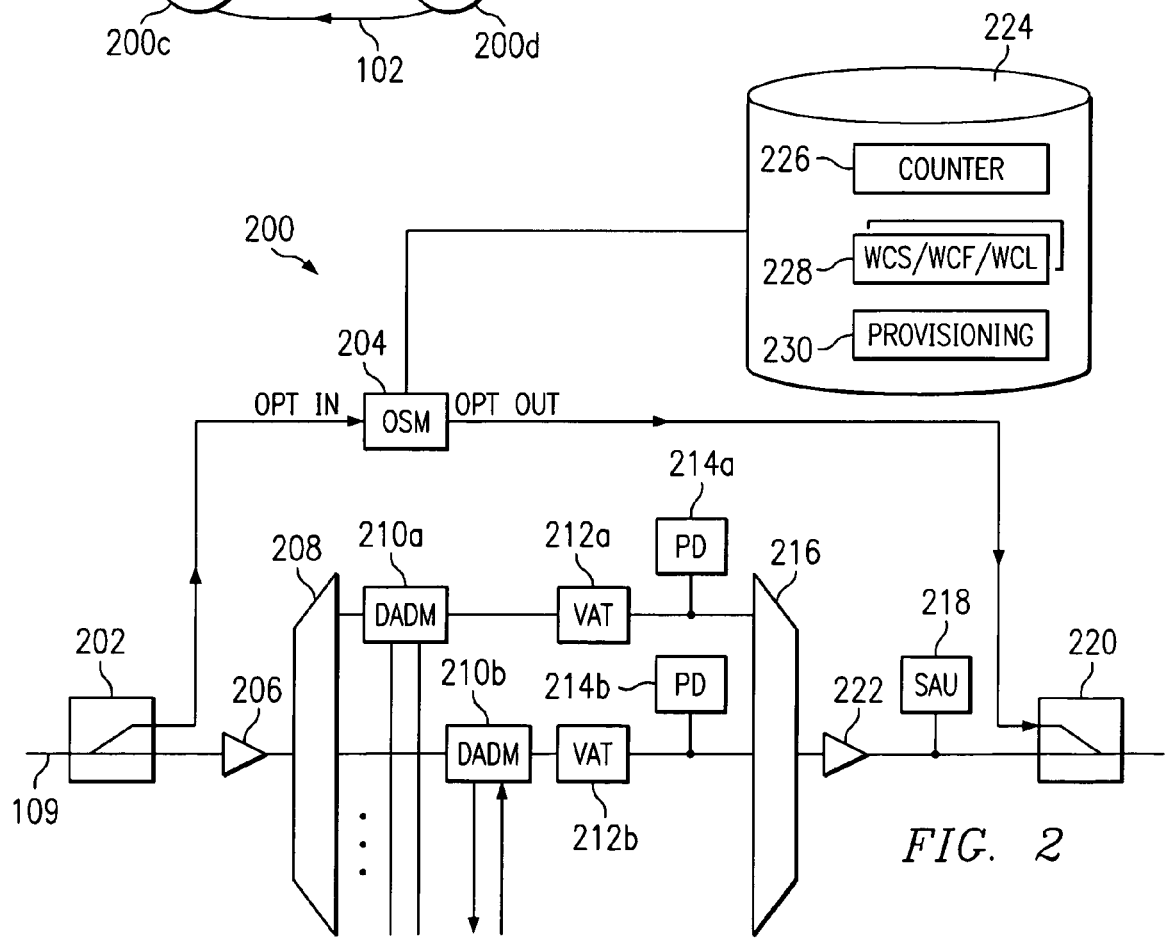
FIG. 2 is an illustration of a network element in the network of FIG. 1.

FIG. 2 shows a particular embodiment of network element 200 in more detail. Element 200 is illustrated with only one direction of signal transmission, but it should be understood that element 200 is not limited to a unidirectional embodiment, but may be bi-directional as well. Element 200 receives optical signals 104 from connection 108 and uses shared information in these optical signals to control operation and respond to errors. In a particular embodiment, element 200 separates out control information and status information from OSC 110 and processes remaining information in optical signal 104 separately.

To separate OSC 110 and data channels, element 200 includes splitter 202. Splitter 202 represents any hardware and/or software for separating the information in OSC 110 from the information communicated in other portions of optical signal 104. In one embodiment, splitter 202 optically separates the wavelength carrying OSC 110 information and routes the information to an optical supervisory module (OSM) 204 for use in management of network element 200, using components such as filters, prisms, diffraction gratings or other suitable components for separating and redirecting light. In an alternative embodiment, splitter 202 represents a combination of the optical splitter described and optical-electronic converters to convert the optical signal 108 of optical supervisory channel 110 into electronic information usable by OSM 204.

Optical supervisory module (OSM) 204 represents any hardware and/or software that interprets information received on OSC 110 and controls various components of element 200 in response to the information. OSM 204 also receives information from components of element 200 in order to detect various failures at network element 200 and to update the information in OSC 110 accordingly. OSM 204 may include any components useful to generate and decode optical signals. OSM 204 also shares channel information with other elements 200.

OSM 204 stores information in a memory 224. Memory 224 represents any form of information storage, whether volatile or non-volatile. Memory 224 may include magnetic media, optical media, removable media, local components, remote components, or any other form of information storage accessible by OSM 204. Memory 224 includes a counter 226 for counting the number of lit channels at a particular time. Memory also stores records 228 for each channel that include current WCS, WCF, and WCL values. Provisioning information 230 stored in memory 224 indicates whether element 200 is receiving, adding, dropping, and/or passing information on each channel.

Pre-amplifier 206 (referred to as "preamp 206") receives optical signal 104 and increases the power level of the signal. Preamp 106 may use Raman amplification, erbium doped fiber amplification (EDFA), or any other suitable form of optical amplification. Alternatively, amplifier 206 may convert optical signal 108 into an electronic signal, and amplify the electrical signal using any suitable electrical amplification method.

Demultiplexer 208 (hereafter referred to as "demux 208") separates optical signal 104 into its respective channels. Demux 208 may include prisms, splitters, diffraction gratings, or any other suitable optical and/or electronic components for splitting signals. Demux 208 may use any separation method appropriate to the signal received from preamp 206, whether optical or electronic.

Optical add-drop multiplexer (OADM) 210 adds, drops, passes through signals for a particular optical channel. In drop mode, OADM 210 removes information from an optical signal 108 and communicating that information to an external device. In add mode, OADM 210 also receives information from an external device and adds the information to optical signal 108. In add-drop mode, OADM 210 both receives information from the external device and drops information to the device. In pass-through mode OADM 210 receives a channel of optical signal 108 and communicates it without adding or dropping any information. OADMs 210 may be provisioned dynamically using control information in OSC 110, so that at various times OADM 210 may be adding, dropping, or passing through depending on what information needs to be communicated at a particular time.

Variable attenuator (VAT) 212 represents a component used to partially or completely diminish the amplitude of a signal. Element 200 uses VATs 212 for tasks such as power balancing and channel output control. VAT 212 can receive information about the intensity of light on various channels and attenuate the power on a channel more or less to provide power balancing for the overall optical signal 104. VAT 212 may also be used to attenuate light in unprovisioned channels, so that if a failure that introduces extraneous light into signal 104 is detected at element 200, VAT 212 may help to correct it.

Multiplexer 216 (hereafter referred to as "mux 216") recombines the separate channels separated from OADMs 210. Mux 216 may include any suitable components, including prisms, switches, diffraction gratings, or any other suitable optical or electronic components. Ordinarily, mux 216 is a passive component so that even if extraneous light is introduced into mux 216, mux 216 will still include that information in the multiplexed signal. Thus the signal resulting from mux 216 may include more active channels than are actually provisioned, due to various errors of components within element 200

Network element 200 also includes components for measuring light levels, generally referred to as photodetectors. One type of photodetector is a photodiode 214. Photodiodes 214 represent any suitable component for detecting the presence or absence of a particular level of light in a channel. Photodiodes 214 may provide feedback to variable attenuators 212 to allow dynamic adjustment of power levels and power balancing. As photodiodes 214 detect light or the absence thereof on a channel, photodiodes 214 communicate this information to OSM 204. This allows OSM 204 to update the WCL value of OSC 110 for each channel to indicate the presence or absence of light on the channel. Spectrum analysis unit (SAU) 218 represents any device for detecting the power level of channels from a multiplexed signal. Thus, SAU 218 may analyze whether each channel in a multiplexed signal has a threshold intensity of light. This allows SAU 218 to perform many of the functions of photodiodes 214 in terms of detecting the presence of light in a channel and providing information to OSM 204, such as identifying the particular channels that are lit and/or indicating the total number of lit channels. SAU 218 may be used separately or as an alternative to photodiodes 214, or used in a complimentary fashion, so that SAU 218 is used to verify information collected from photodiodes 214 and to diagnose possible component failures in mux 216.

Post-amplifier 222 (hereafter referred to as "postamp 222") amplifies the multiplexed signal output by mux 216 to facilitate communication of the signal to the next network element 200. Postamp 222 may include any suitable form of optical and/or electronic amplification. If the multiplexed signal is in electronic form, postamp 222 may perform suitable conversions so that the signal may be communicated to the next network element 200 as an optical signal. In particular embodiments, postamp 222 provides a uniform amplification to all channels so that the total power of the signal reaches a predetermined level, which is usually the maximum attainable by the amplifier. This ensures that the signal is carried with as much available power as possible, increasing the likelihood that the signal will arrive at the next network element 200 with sufficient power to be decipherable.

Adder 220 combines an updated OSC 110 signal with the multiplex signal output by mux 216 and amplified by postamp 222. Adder 220 may include any suitable optical components or electronic components including prisms, switches, diffraction gratings, or any other suitable component for combining signals.

In operation, element 200 receives OSC 110 information and uses the information to perform tasks such as amplifier control, failure detection, and protection switching. Element 200 dynamically updates OSC 110 information based on changing conditions at element 200 and communicates the information to network elements 200 or other external devices. In this manner, element 200 both improves its own operation using information from previous elements 200 and provides subsequent elements 200 with similarly useful information.

In a particular embodiment, element 200 receives an optical signal 104 from connection 108. Splitter 202 communicates an OSC 110 portion of the signal 104 to OSM 204. OSM 204 then uses the information in OSC 110 to determine an amplification level for signal 104. OSM 204 counts the number of lit channels based on the number of WCL values that indicate a lit channel. Using this number of lit channels, OSM 204 calculates a total power level for the output of preamp 206 by multiplying the number of lit channels by a predetermined per-channel power level, and sets preamp 206 to the calculated total power level. The per-channel power level is selected so that the power level on each channel is neither so high as to produce signal distortion nor so low as to make the signal on a channel undetectable. In a power-balanced signal, adjusting the amplification level to produce the proper total power level implicitly results in each channel having the appropriate per-channel level.

The particular embodiment described is only one example of a method of amplifier control. Numerous variations will be apparent to one skilled in the art. For example, amplification may be performed on a channel-by-channel basis using specific information in OSC 110 about the intensity of light on a particular channel. Preamp 206 may then perform power balancing between channels as well as amplification. In general, any suitable method for controlling amplifiers based on information about the light level in particular channels may be incorporated into element 200.

In addition to controlling preamp 206, OSM 204 also exchanges optical supervisory information with external devices and network elements 200 to facilitate fault detection and broadcast suitable alarms. One example of such an information exchange is described below. In this particular example, OSM 204 uses optical supervisory information that includes WCS, WCF, and WCL values for each channel.

The WCS value indicates whether or not a particular channel is provisioned, and OSM 204 uses this information to determine whether or not to expect light on a particular channel. OSM 204 updates the WCS value to inform the next network element 200 in network 100 whether or not information is expected. For example, if element 200 is dropping information from a channel and not adding any new information, the incoming WCS value would indicate that the channel is provisioned, while the outgoing WCS value would indicate that the channel is not provisioned.

The WCF value indicates a failure on a channel. The failure may take any suitable form, including light on an unprovisioned channel, lack of light on a provisioned channel, errors in exchanging information with external elements, or any other condition that interferes with the successful communication of information on optical network 100. OSM 204 updates the WCF value whenever a failure condition manifests itself at element 200. For example, when OSM 204 detects light on an unprovisioned channel, OSM 204 updates the WCF value and generates an alarm. OSM 204 may also generate any suitable alarms for components of element 200 or to external devices based on the WCF value. For example, if there is an error on an incoming channel that is dropped to an external device, OSM 204 may generate an alarm signal for the external device. In cases where a failure has already been detected by a previous element 200, OSM 204 may pass the WCF value through the network without updating or alarming in order to facilitate location of the root cause at the previous network element 200.

The WCL value indicates whether a channel is lit, regardless of whether the channel provisioned or not. OSM 204 updates WCL based on the constant monitoring of each channel by photodetectors. OSM 204 also compares WCL values to outgoing WCS values to determine whether there is extraneous or missing light in a channel, which may in turn be used to update WCF values and to generate suitable alarms in case of mismatches.

In case of failure or interruption in OSC 110, OSM 204 may "latch" received values by periodically storing them in memory 224. This provides a record of previously detected failures so that technicians can reconstruct a failure event. Furthermore, latched WCL values received from failed network elements 200 may provide useful information for diagnosing the type of failure from a time before the failed element 200 went out of service.

Using the information in OSC 110, OSM 204 performs the functions of fault detection, fault propagation, and alarming. OSC 110 detects faults by comparing WCS and WCL values to expected value based on provisioning information. Thus, for example, if OSM 204 detects light on an unprovisioned channel, OSM 204 determines that a failure event has occurred. OSC 110 propagates detected faults by passing on previously detected faults to the next network element 200, and by updating OSC 110 information to reflect any faults that are detected at network element 200. As fault conditions are detected or reported, OSM 204 generates appropriate alarms locally and in external devices. OSM 204 may also apply rules to its fault propagation and alarming functions to facilitate fault identification. For example, if a fault event is detected at a first network element 200, subsequent network elements 200 may suppress the alarm so that the root cause may be identified more readily. Similarly, if an error is on a channel that is dropped, OSM 204 may report the error to the external device to which the information is dropped in addition to, or as an alternative to, notifying the next network element 200. These are only some of the many possible examples in which the information in OSC 110 may be useful in fault detection, fault propagation, and alarming.

Element 200 may also use the information in OSC 110 for protection switching. In one example of protection switching, element 200 determines that an adjacent network element 200 has failed based on information in OSC 110, whether communicated from the failed element 200 or otherwise propagated through network 100. Rather than continuing to communicate signals to the failed element 200, element 200 may reroute traffic along a protection path based on the failure determination. Element 200 may continue to monitor the status of failed element 200 so that traffic may be returned to the original path whenever failed element 200 is restored to operation.

Figure 3:
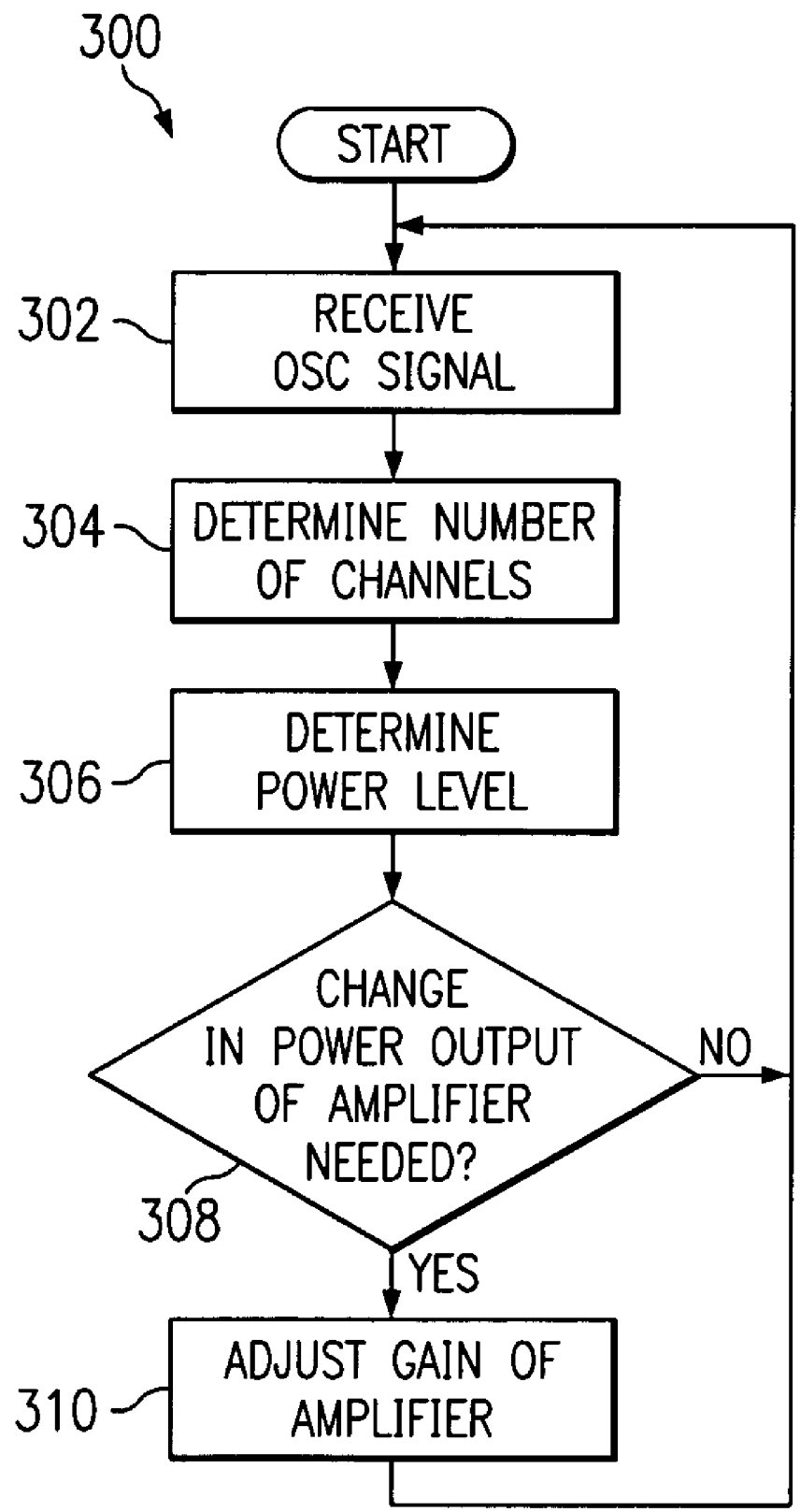
FIG. 3 is a flow chart illustrating a method for controlling an amplifier using shared channel information.

FIG. 3 is a flow chart 300 that illustrates a method for adjusting amplifier power using OSC 110. At step 302, element 200 receives an OSC signal 110. Element 200 determines the number of channels based on OSC 110 information at step 304. Element 200 determines an appropriate power level for the amplifier based on the number of channels at step 306. For example, element 200 may assign the power level based on the number of channels.

At step 308, element 200 determines if the current assigned power level for the amplifier matches the desired power level based on the number of incoming channels at step 308. Often, when a failure develops, amplifier will be expecting a different power level than the actual input and, therefore, the amplitude of the amplifier's output will need to be adjusted. For example, if the link is provisioned for 30 channels, but failures have allowed 40 channels to become active, preamp 206 should respond to the actual number of active channels. If an adjustment is needed, element 200 sends a control message to preamp 206 instructing the amplifier to adjust its output level accordingly. As illustrated in FIG. 3, this process may be ongoing, as the output level for preamp 206 is continually adjusted to reflect developments and failures in particular channels.

Figure 4:
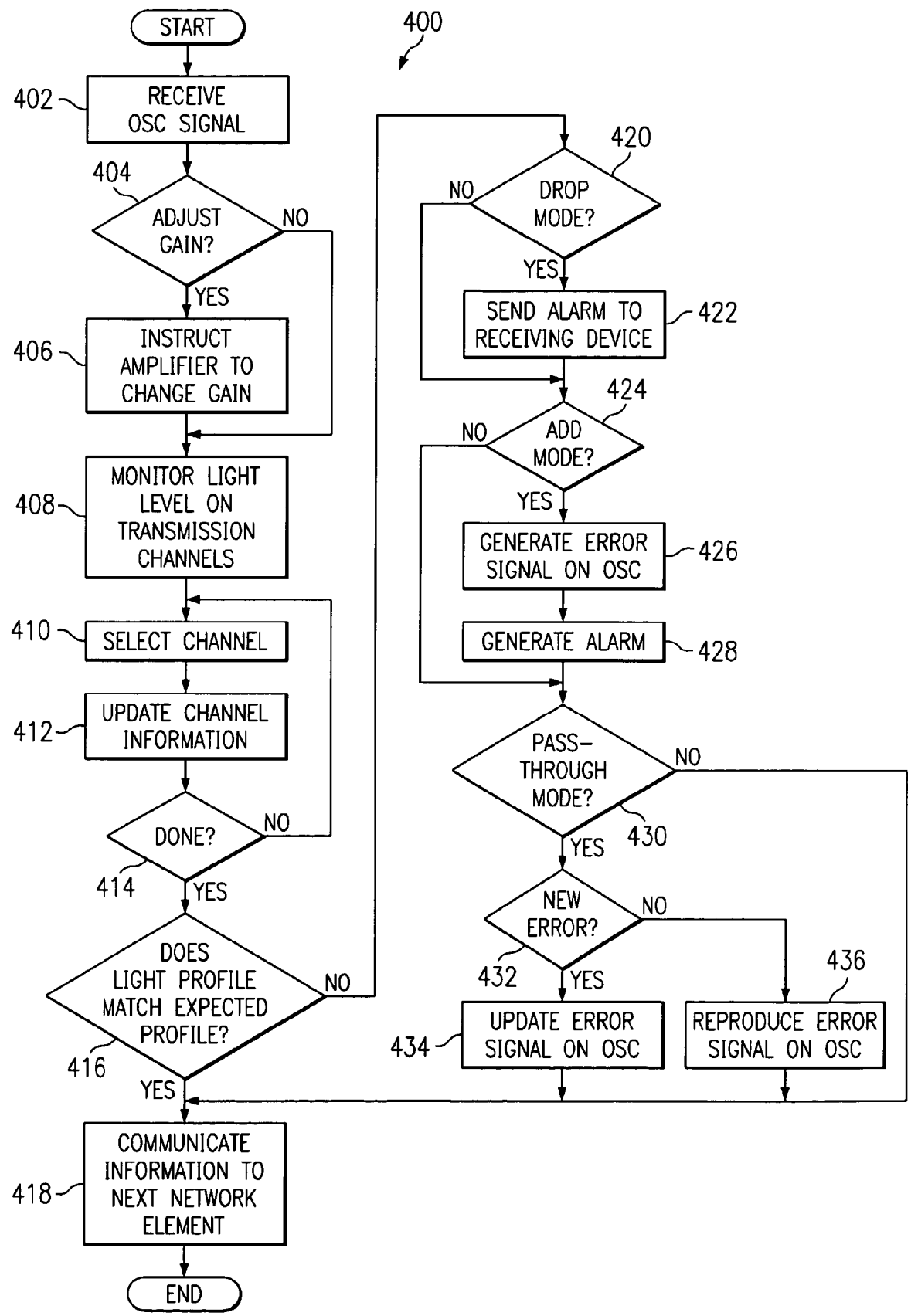
FIG. 4 is a flow chart illustrating a method for monitoring failures in a network element and updating OSC information.

FIG. 4 illustrates a method for updating the contents of OSC 110 at a network element 200. Element 200 receives an OSC signal 110 at step 402. Element 200 determines whether to adjust the gain at step 404 and if necessary instructs the amplifier to adjust its gain at step 406. For example, OSM 204 might determine with amplification level using any of the methods described above. Components of element 200 monitor the light level on various transmission channels at step 408.

After the light levels are monitored, OSM 204 determines whether information on OSC 110 needs to be updated. To do so, OSM 204 selects a channel at step 410, and updates channel information if necessary at step 412. For example, if OSC 204 detects light on a channel with a WCL bit (one example of a WCL value) is currently set to zero, OSM 204 updates the bit to reflect the presence of light. OSM 204 repeats this process for all channels as shown by the logic at step 414.

At step 416, OSM 204 determines whether the light profile on the channels matches the expected light profile according to provisioning and the current OSC 110 information. If the light profile matches what is expected, OSM 204 may communicate OSC 110 information as is to the next network element 200 and optical network 100 at step 418. On the other hand, if the light profile does not match the expected profile, OSM 204 may update the light profile to alert the next network element 200, and may also need to submit appropriate alarms to various components of element 200.

If element 200 is in drop mode for a channel whose profile does not match the expected profile at step 420, then OSM 204 sends an alarm to the receiving device at step 422. This indicates to the receiving device that the expected light profile did not match the type of information expected, so that the receiving device may be receiving extraneous information or not receiving expected information. If element 200 is in add mode at step 424, OSM 204 may send two warnings. First, OSM 204 generates an error signal on OSC 110 to indicate to the next network element 200 that extra information will be received or that expected information will not be received. Next, OSM 204 generates an alarm for element 200 at step 428 to indicate to technicians and/or users that there has been a failure to successfully add information to the network.

If element 200 is in pass-through mode at step 430, OSM 204 determines if any errors in the light profile matching the expected profile were previously detected and indicated by OSC 110 at step 432. If the errors have previously been detected, OSM 204 does not need to update the signal on OSC 110, because it already reflects the error. Thus, OSM 204 reproduces the error signal that already exists on OSC 110 at step 436. On the other hand, if a new error has developed, OSM 204 updates the error signal on OSC 110 to indicate the new error at step 434. If element 200 is not in pass-through mode, all of the updating will have been performed by previous steps in the method as described earlier.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for optical supervisory signaling, comprising:
   determining, for each one of a plurality of data channels serviced by a first optical communication node:
   a wavelength channel status value indicating whether the channel has been provisioned;
   a wavelength channel failure value indicating whether a failure has been detected on the channel; and
   a wavelength channel lit value indicating whether the channel is active; and
   communicating the wavelength channel status value, the wavelength channel failure value, and the wavelength channel lit value to a second optical communication node.

2. The method of claim 1, wherein:
   each channel is communicated on a respective wavelength; and
   the wavelength channel status value, the wavelength channel failure value, and the wavelength channel lit values for all of the data channels are communicated on an optical supervisory channel.

3. The method of claim 1, further comprising:
   receiving wavelength channel lit values from an adjacent optical node;
   determining a number of active data channels based on the wavelength channel lit values;
   determining an amplification level for the optical signal based on the number of active data channels; and
   amplifying the optical signal at the amplification level.

4. The method of claim 1, further comprising:
   detecting light on an unprovisioned data channel;
   determining a failure state based on the detection;
   updating the wavelength channel failure value to reflect the failure state; and
   generating an alarm based on the failure state.

\* \* \* \* \*

UNITED STATES PATENT AND TRADEMARK OFFICE
CERTIFICATE OF CORRECTION

PATENT NO. : 7,327,954 B2 Page 1 of 1
APPLICATION NO. : 10/161274
DATED : February 5, 2008
INVENTOR(S) : Paparao Palacharla et al.

It is certified that error appears in the above-identified patent and that said Letters Patent is hereby corrected as shown below:

On Title Page, Right Column, Item (56), References Cited, U.S. Patent Documents, delete "2002/0027703" and insert -- 2001/0027703 --.

Signed and Sealed this

Twenty-third Day of December, 2008

JON W. DUDAS
*Director of the United States Patent and Trademark Office*